United States Patent
Osugi et al.

(10) Patent No.: US 8,042,979 B2
(45) Date of Patent: Oct. 25, 2011

(54) HEADLIGHT ASSEMBLY FOR A MOTORCYCLE

(75) Inventors: Hiroyuki Osugi, Saitama (JP); Naoki Murasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 12/322,104

(22) Filed: Jan. 29, 2009

(65) Prior Publication Data
US 2009/0231869 A1 Sep. 17, 2009

(30) Foreign Application Priority Data

Mar. 14, 2008 (JP) ................................. 2008-066195

(51) Int. Cl.
*B62J 6/00* (2006.01)
*F21V 33/00* (2006.01)
(52) U.S. Cl. ........ 362/475; 362/476; 362/428; 362/549; 362/44
(58) Field of Classification Search .................. 362/427, 362/428, 475, 476, 460, 464–468, 37, 43, 362/44, 507, 512, 514–516, 549, 420, 421; 361/523–532
See application file for complete search history.

(56) References Cited

U.S. PATENT DOCUMENTS

| | | | | |
|---|---|---|---|---|
| 5,412,543 A | * | 5/1995 | Kobayashi et al. | 362/524 |
| 5,426,571 A | * | 6/1995 | Jones | 362/466 |
| 6,550,944 B2 | * | 4/2003 | Kusagaya | 362/466 |
| 6,652,130 B2 | * | 11/2003 | Mochizuki et al. | 362/517 |
| 6,857,768 B2 | * | 2/2005 | Watanabe et al. | 362/512 |
| 6,951,417 B2 | * | 10/2005 | Ito et al. | 362/547 |
| 7,188,980 B2 | | 3/2007 | Ase et al. | |
| 7,261,448 B2 | * | 8/2007 | Ishida et al. | 362/507 |
| 2003/0072164 A1 | * | 4/2003 | Watanabe et al. | 362/465 |
| 2003/0090906 A1 | * | 5/2003 | Hayakawa | 362/517 |
| 2008/0112174 A1 | * | 5/2008 | Nakano et al. | 362/466 |

FOREIGN PATENT DOCUMENTS

| JP | 60-44303 | 3/1985 |
|---|---|---|
| JP | 05-085253 | 4/1993 |

* cited by examiner

*Primary Examiner* — Anabel Ton
*Assistant Examiner* — Danielle Allen
(74) *Attorney, Agent, or Firm* — Carrier Blackman & Associates, P.C.; Joseph P. Carrier; William D. Blackman (57) ABSTRACT

A headlight case, that houses a light body, is made small in size. The light body includes a reflector, and a lens attached to the reflector. The light body is pivotally supported in the headlight case by bolts extending through a ring member extending around the light body, so that an aiming operation can be performed. The ring member is connected to the light body behind the lens, and is locked to the headlight case at a position spaced away from an open edge thereof. A ring body of the ring member has an outer shape smaller than a maximum outer shape of the light body. A rim, to be fitted around the open end of the headlight case, has a lead that extends toward a position spaced away from the open end of the headlight case, to be fitted into a concave part of the headlight case.

14 Claims, 11 Drawing Sheets

HEADLIGHT ASSEMBLY FOR A MOTORCYCLE

CROSS-REFERENCE TO RELATED APPLICATIONS

The present invention claims priority under 35 USC 119 based on Japanese patent application No. 2008-066195, filed on Mar. 14, 2008. The entire subject matter of this priority document, including specification claims and drawings, is incorporated by reference herein.

BACKGROUND OF THE INVENTION

1. Technical Field of the Invention

The present invention relates to a motorcycle headlight, and particularly to a motorcycle headlight having a structure in which a light body is adjustably supported within a headlight case, so that an aiming operation can be performed.

2. Background Art

A known motorcycle headlight has a structure in which a light body is adjustably supported by a headlight case, so that an aiming operation can be performed. For example, Patent Document 1 discloses a headlight which includes a lamp cover, and a frame arranged in front of the lamp cover. In this known headlight, an upper edge of a light body is hung on the frame, and an end of an adjustment piece, provided at a lower edge of the light body, is connected to the frame through an adjustment screw.

In addition, Patent Document 2 discloses a headlight having a headlight case divided into upper and lower cases. In this known headlight, a light body is pivotally supported by the lower case, and circumferential end parts of the upper and lower cases are bound with a shade ring. Further, an adjustment piece extending from the light body, and a fixing piece extending from the shade ring, are fixed to the lower case with an aiming bolt.

[Patent Document 1] Japanese Utility Model Application Laid-open Publication No. Sho 60-44303

[Patent Document 2] Japanese Unexamined Patent Application Publication No. Hei 5-85253

In conventional headlights as disclosed in Patent Documents 1 and 2, a support part, configured for supporting the light body so that an aiming operation can be performed, supports a maximum outer diameter part of the light body near an opening of the headlight case. The headlight case is thus designed to surround a structural support part which is, in turn, surrounds the light body. Accordingly, the known headlights are generally required to be formed in a large size.

Although the known headlight assemblies have some utility for their intended purposes, a need still exists in the art for an improved headlight assembly. In particular, there is a need for an improved headlight assembly which is relatively small in size, yet which has a structure which facilitates an aiming operation of a light body.

SUMMARY OF THE INVENTION

The present invention provides a motorcycle headlight having a structure suitable for maintaining a small size of a headlight case, the headlight having a structure which facilitates an aiming operation of a light body therein.

According to a first aspect of the present invention, a motorcycle headlight includes: a light body including a reflector having an outer diameter being narrowed down from its front part to its rear part, and a lens attached to a front face of the reflector; a ring member that surrounds an outer circumference of the light body; and a headlight case in which the light body is pivotally supported through the ring member, so that an aiming operation can be performed. In the motorcycle headlight, the headlight case is in a shape in which its inner diameter gets smaller from its front part to its rear part, and the ring member pivotally supports the light body at a position rearward of the lens, and is locked to the headlight case at a position spaced rearwardly away from an open end of the headlight case.

A second aspect of the present invention is the motorcycle headlight in which: the ring member includes a ring body and a curved piece protruding downward from the ring body, and an outer shape of the ring body is designed to be smaller than a maximum outer shape of the light body.

A third aspect of the present invention is the motorcycle headlight, in which a maximum outer shape part of the light body is a ring-shaped retainer that surrounds the lens and the open end of the headlight case.

A fourth aspect of the present invention is the motorcycle headlight which further includes a rim being fitted to the open end of the headlight case, and having a rearwardly projecting part extending to a position spaced away from the open front end of the headlight case. Moreover, a concave part is formed in a lower part of the headlight case so that the rearwardly projecting part of the rim is fitted to the concave part, the concave part being cut from the open end of the headlight case to the position spaced away from the open end.

A fifth aspect of the present invention is the motorcycle headlight, in which a lower end part of the ring member is designed to be in a position above an innermost area in the concave part.

A sixth aspect of the present invention is the motorcycle headlight in which the ring member and the headlight case are connected to each other with: an engagement part made up of a hole formed in an upper part of the ring member and a boss formed on an upper inner surface of the headlight case in a projecting manner; a bolt-nut connecting part for connecting the ring member to the headlight case; and a bolt-nut connecting part for connecting the rearwardly projecting part of the rim to the curved piece of the ring member.

According to the first, second, and third aspects of the present invention, the light body is held by the ring member around a small-diameter part behind the lens, in other words, behind the front portion of the reflector having the outer diameter being narrowed down to the rearward. Accordingly, unlike a case where the ring member is provided around a large-diameter part of the lens part, namely, of the reflector, the light body can be locked to the inner surface of the headlight case without causing the ring member to be enlarged in a direction from the light body to the outer circumference. As a result, the inner diameter of the open end of the headlight case can be designed to have a size enough to leave a space between the headlight case and the outer diameter of the light body, the space being necessary for an aiming operation. Thereby, the headlight case as a whole can be reduced in size.

According to the fourth and fifth aspects of the present invention, the concave part cut from the open end of the headlight case to the position set back far from the open end is formed. When the light body is to be locked with the headlight case by fixing the ring member to a position set back far from the open end of the headlight case, fingers holding the light body can be inserted to the rear of headlight case by making use of the concave part. This improves workability. Further, when the rim is attached, the rearwardly projecting part of the rim is fitted into the concave part to cover the concave part.

According to the sixth aspect of the present invention, the rim is fixed to the headlight case by connecting the ring member to the headlight case by the bolt-nut connecting part, and by further connecting the ring member to the rearwardly projecting part extending from the rim to the concave part of the headlight case.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 4:
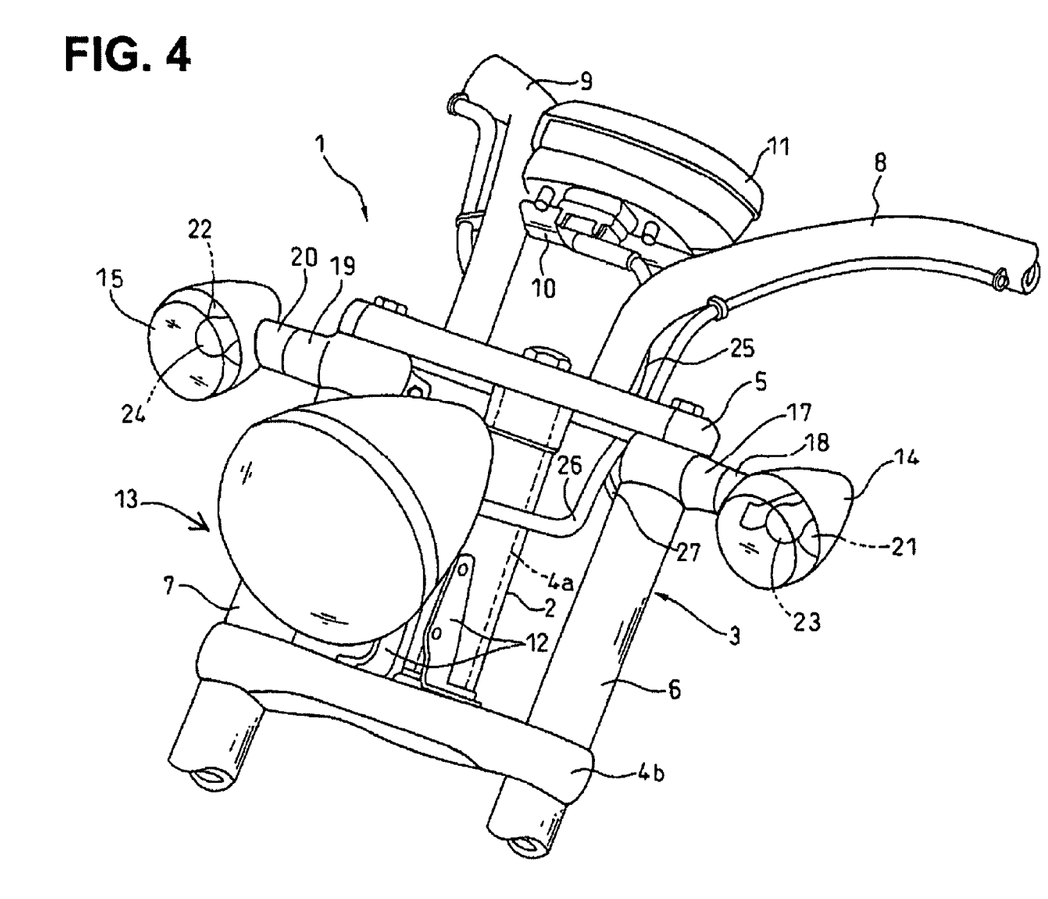
FIG. 4 is a perspective view showing a main part of a motorcycle on which the headlight according to the embodiment of the present invention is mounted.

An illustrative embodiment of the present invention will now be described, with reference to the drawings. FIG. 4 is a perspective view showing a front structure of a motorcycle 1 provided with a headlight according to the embodiment of the present invention. The motorcycle 1 has a head pipe 2 connected to a front end of a main frame (not shown) of a vehicle body frame. A steering assembly 3 is movably supported by the head pipe 2. The steering assembly 3 includes: a steering stem 4a which is pivotally supported by the head pipe 2; a lower bridge 4b provided on a lower part of the steering stem 4a; a top bridge 5 provided on an upper part of the steering stem 4a; left and right front forks 6 and 7 supported by the lower bridge 4b and the top bridge 5; and left and right steering handlebars 8 and 9 whose lower parts are attached to the top bridge 5, and whose upper parts extend upwardly in left and right directions, respectively. A front axle (not shown), that supports a front wheel thereon, is attached to lower parts of the front forks 6 and 7.

A cross pipe 10 is hung between the steering handlebars 8 and 9. An instrument cluster 11 is mounted on the cross pipe 10. A set of first and second stays 12 is attached to the lower bridge 4b, and a headlight 13 is supported by the of stays 12.

Left and right turn signal indicators 14 and 15 are respectively attached to upper parts of the left and right front forks 6 and 7, namely, to an underside of the top bridge 5. The turn signal indicator 14 includes a stay 17 and a base 18 fitted to the stay 17. The stay 17 has a tubular bore formed therein with an inner cross-section formed in a substantially circular shape that fits around a cylindrical outer shape of the front fork 6. Likewise, the turn signal indicator 15 includes a stay 19 and a base fitted to the stay 19, and the stay 19 has a tubular bore formed therein with an inner cross-section formed in a substantially circular shape to fit around a cylindrical outer shape of the front fork 7. The stays 17 and 19 are preferably made of a rubber-like elastic material (a polymer material such as a thermoplastic olefin elastomer). The turn signal indicators 14 and 15 include light bulbs 23 and 24, respectively supported by bulb holders 21 and 22.

A harness 25 drawn out of the instrument cluster 11 includes a headlight power supply cord 26 extended to the headlight 13, and a turn signal power supply cord 27 extended to the turn signal indicator 14.

Headlight Structure

Figure 1:
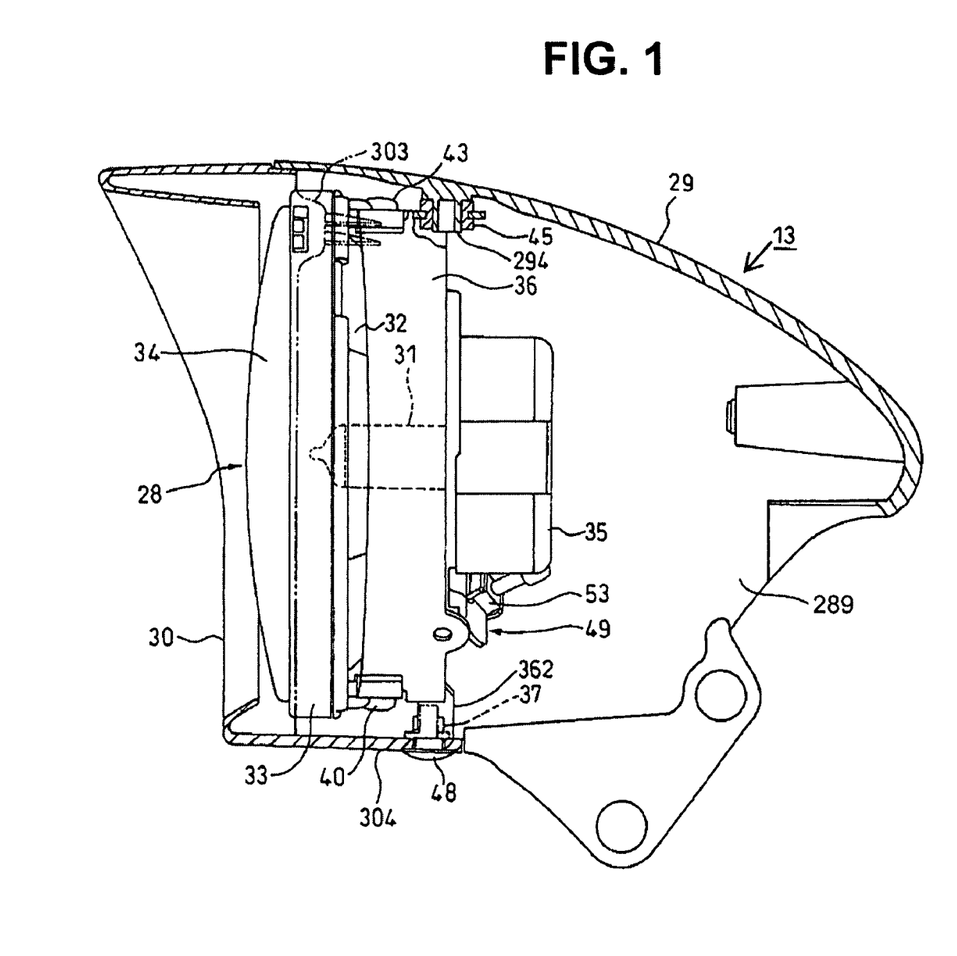
FIG. 1 is a cross-sectional view showing a side of a main part of a headlight according to an embodiment of the present invention.
Figure 2:
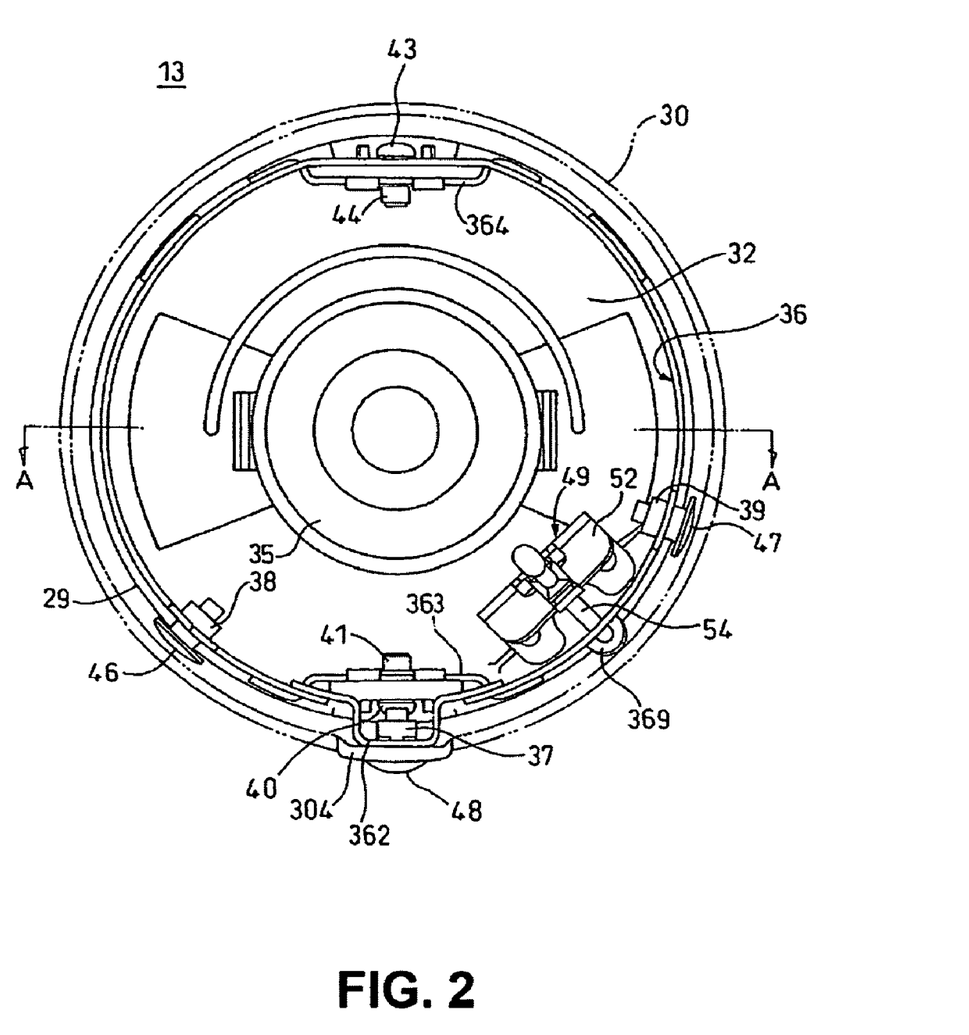
FIG. 2 is a cross-sectional view showing a rear of the main part of the headlight according to the embodiment of the present invention.
Figure 3:
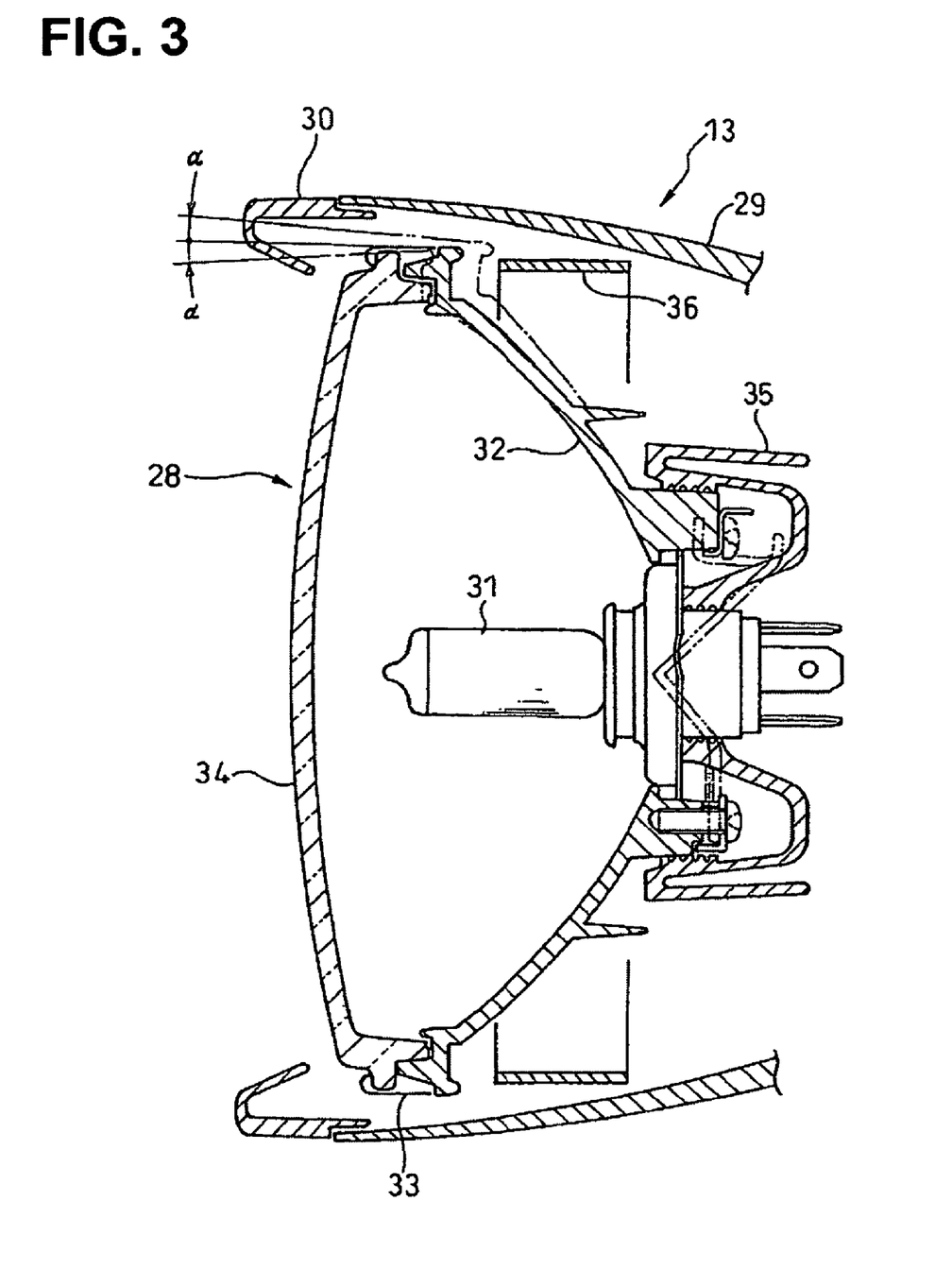
FIG. 3 is a cross-sectional view top view of the headlight, taken along the line A-A in FIG. 2.

A detailed description will now be given of the headlight 13. FIG. 1 is a side view of the headlight 13, FIG. 2 is a back view of the headlight 13, and FIG. 3 is a cross-sectional view of the headlight 13 taken along the line A-A in FIG. 2. The headlight 13 includes a light body 28, a headlight case 29 housing the light body 28, and a rim 30 attached around the front of the headlight case 29. Each of these components will be described in further detail below.

As seen best in FIGS. 1-3, the light body 28 includes a light bulb 31, a reflector 32 housing the light bulb 31, and a lens 34 fixed to the front of the reflector 32 by a ring-shaped retainer 33. The reflector 32 has a partially spherical shape. Specifically, the reflector 32 has a large diameter at its front so as to correspondingly face the lens 34, and the diameter gets smaller as the reflector extends toward the rear. The light body 28 also includes a rubber cover seal 35, which extends around and covers respective rear end portions of the bulb 31 and the reflector 32.

The light body 28 is attached to the headlight case 29 via a ring member 36. As will be described later, the ring member 36 is affixed to the headlight case 29, and the light body 28 is adjustably pivotally supported on the ring member, so that an aiming operation can be performed in left and right directions with respect to the ring member 36, in an angle range of $\alpha°$ (FIG. 3).

Figure 5:
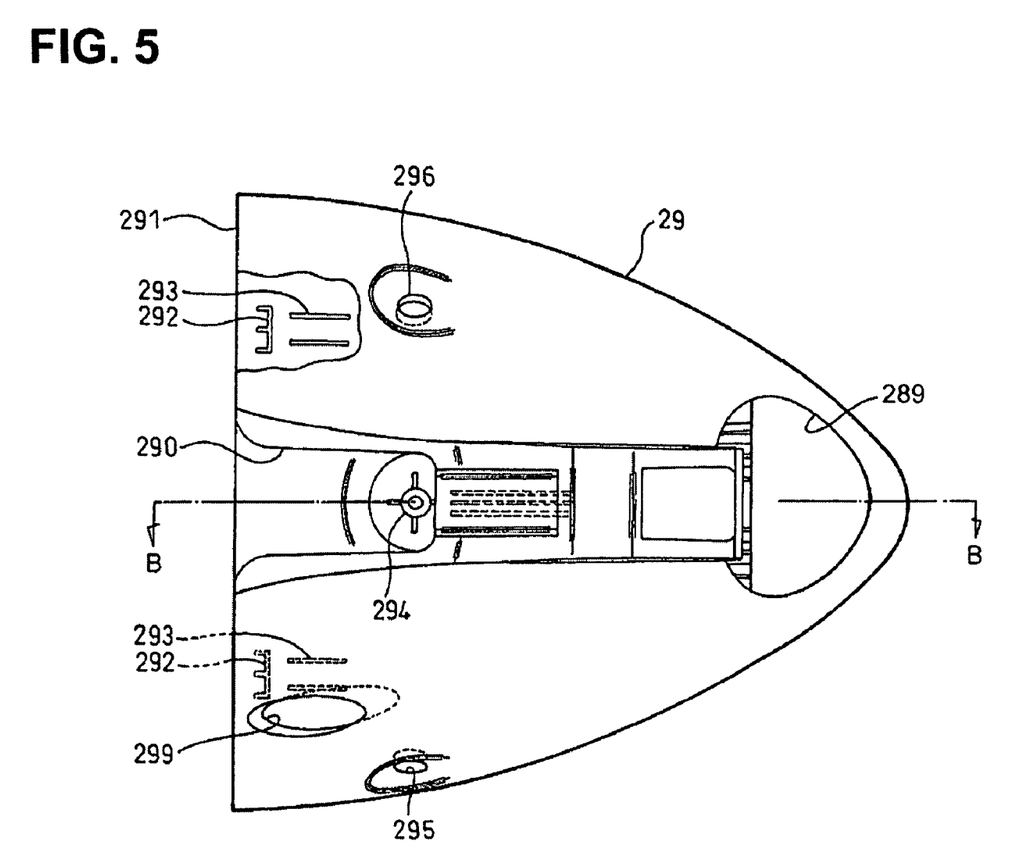
FIG. 5 is a bottom view of a headlight case.
Figure 6:
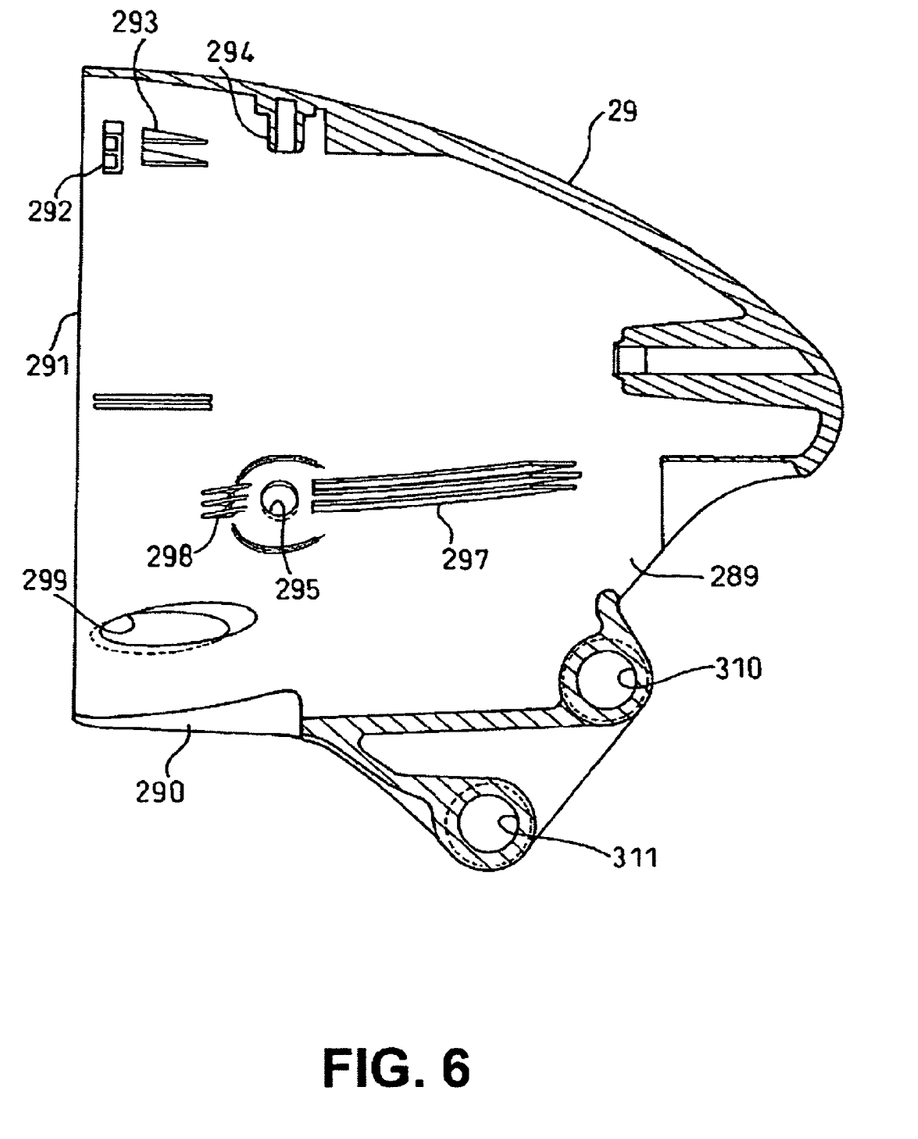
FIG. 6 is a cross-sectional view taken along the line B-B in FIG. 5.
Figure 7:
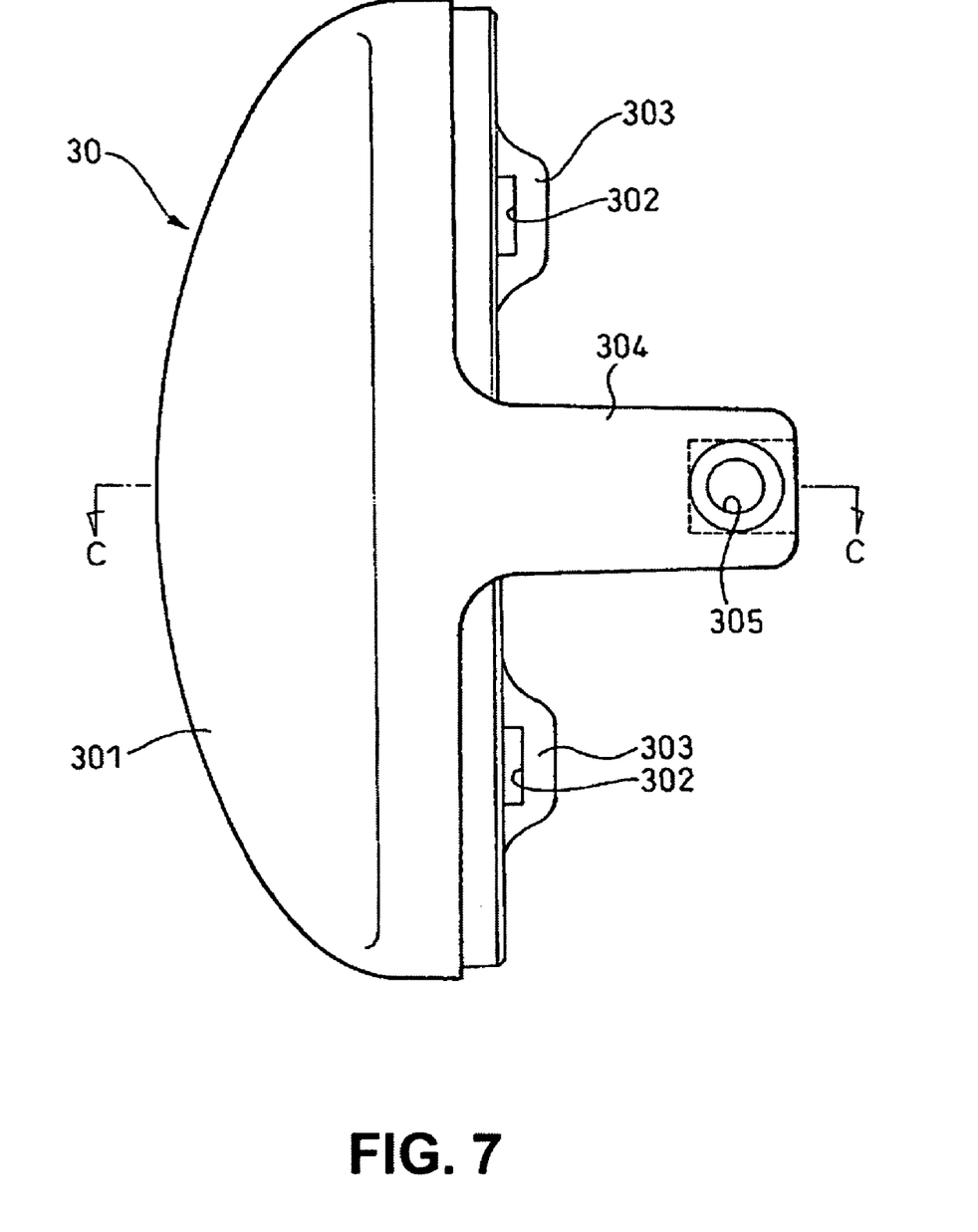
FIG. 7 is a bottom view of a rim.
Figure 8:
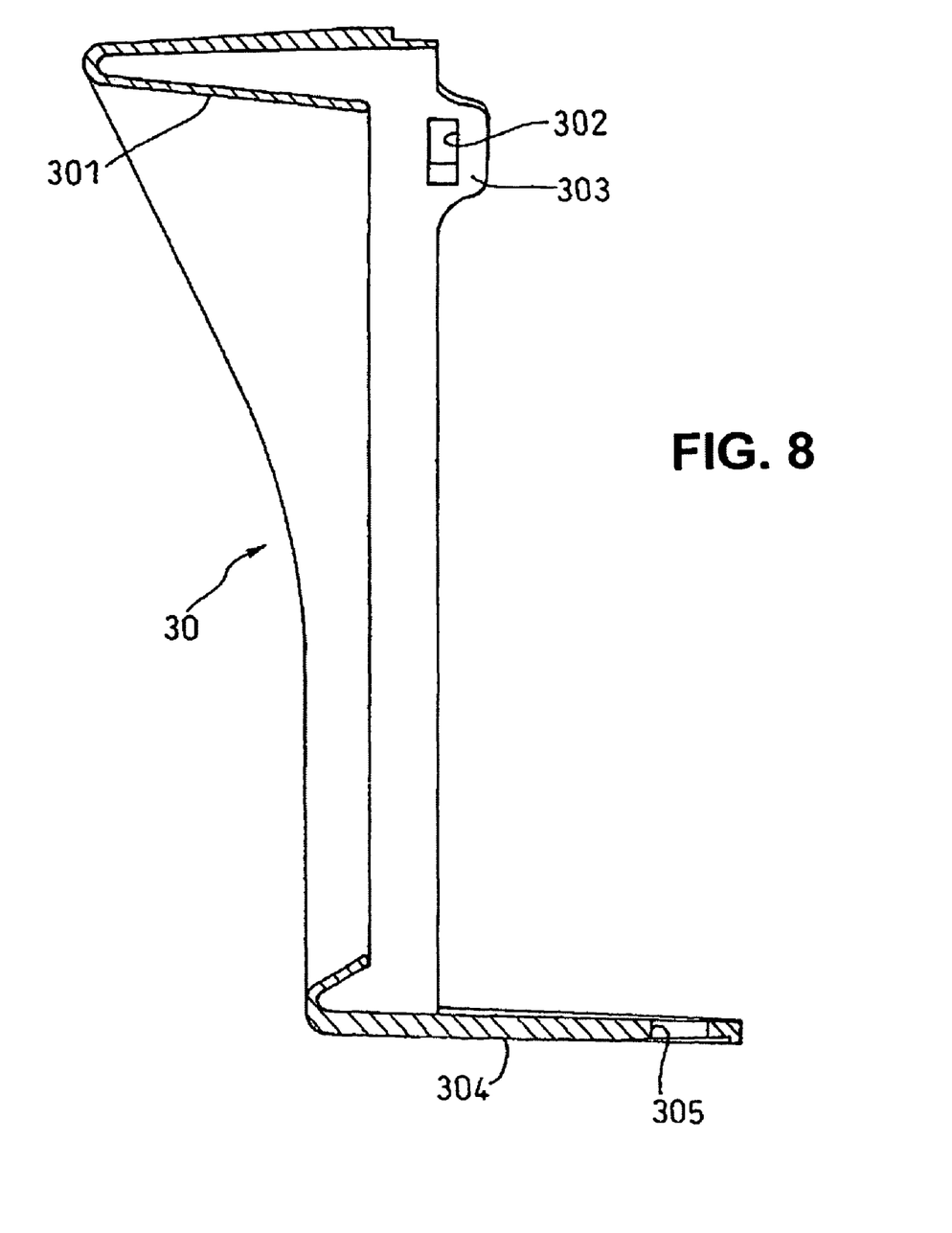
FIG. 8 is a cross-sectional view taken along the line C-C in FIG. 7.

FIG. 5 is a bottom view of the headlight case 29, and FIG. 6 is a cross-sectional view of the headlight case 29, taken along the line B-B in FIG. 5. Further, FIG. 7 is a bottom view of the rim 30, and FIG. 8 is a cross-sectional view of the rim 30, taken along the line C-C in FIG. 7.

In FIGS. 5 and 6, it will be seen that the headlight case 29 is formed in a modified conical shape, generally resembling a half-football shape (half prolate spheroid). A front end 291 of the headlight case 29 is open to receive the light body 28 therein. A hole 289 is formed at a lower side of the apex of the modified conical shape, to allow an electric wire (not shown) connected to the light body 28 to be drawn out. Near the front 291, two sets of first and second ribs 292, 293 are formed on the left and right sides of the headlight case 29, respectively, for locking engagement with holes formed in a rim 30, as will be described further herein.

An internal boss 294 is formed on the headlight case 29 extending downwardly at an upper position set back a little from the sets of ribs 292 and 293. The right side surface of the headlight case 29 is provided with a through-hole 295 for receiving a bolt (described later) for fixing the position of the light body 28. The left side surface of the headlight case 29 is provided with a through-hole 296 similar to the through-hole 295 (See FIG. 5). Reinforcement ribs 297 and 298 are formed to strengthen the case adjacent the through-hole 295. An operation hole 299 through which an edge part of a bolt (described later) for aiming (in the left and right directions) is seen is formed in the lower side surface of the headlight case 29.

The headlight case 29 further has a cut concave part 290 hollowed out and formed at the lower front end thereof, with the cut concave part extending from the front 291 toward the rear of the headlight case 29. Transverse mounting holes 310 and 311 (FIG. 6) are pierced in the headlight case 29, extending in a horizontal direction at a lower rear part thereof. The mounting holes 310 and 311 are used when the headlight 13 is connected to the stays 12.

As shown in FIGS. 1-3, the rim 30 is formed in a ring shape that extends around and engages the front 291 of the headlight case 29. Detailed structure of the rim 30 is shown in FIGS. 7 and 8. The rim 30 has a visor 301 extending forwardly at a top central portion thereof, corresponding to the upper part of the headlight 13. Engagement parts 303, each having a rectangular engagement hole 302, are formed at a top rear portion (when mounted on the vehicle body) of the rim 30. The sets of ribs 292 and 293 (FIG. 5) of the headlight case 29 engage with the respective engagement parts 303, by removably locking into the respective engagement holes 302. A rearwardly-projecting tab 304 is formed at a central lower portion of the rim 30, corresponding to the lower part of the headlight 13. The tab 304 is provided with a through-hole 305 therein for receiving a bolt (described later). The tab 304 is designed with a shape that fits into the aforementioned cut concave part 290 of the headlight case 29.

Figure 9:
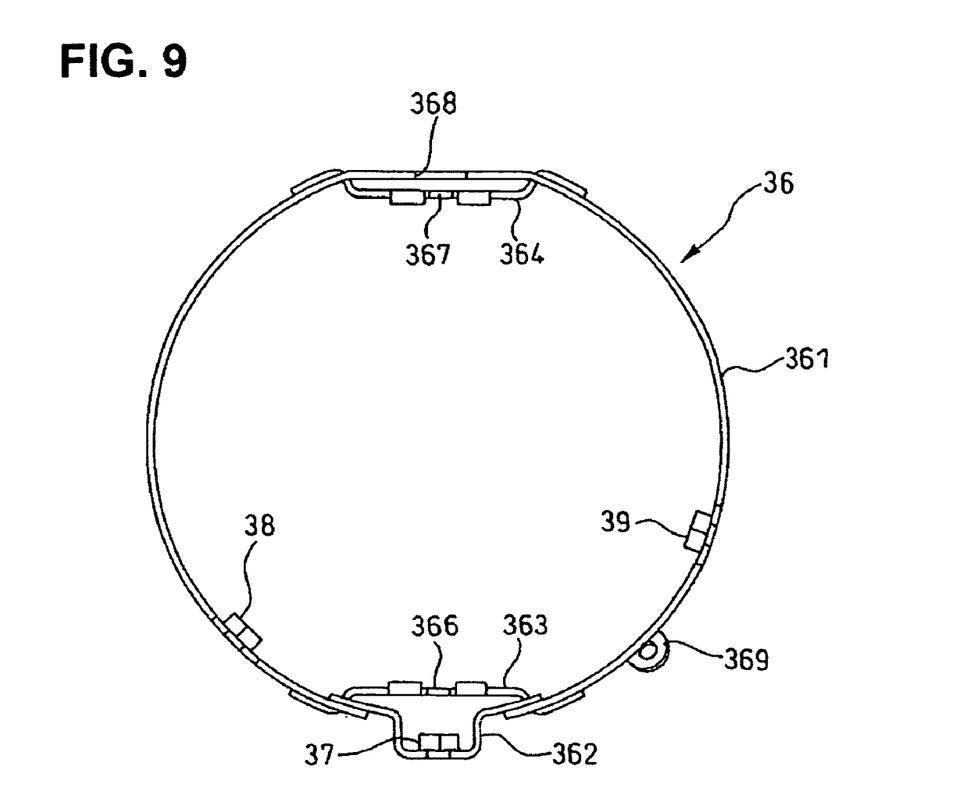
FIG. 9 is a front view of a ring member.
Figure 10:
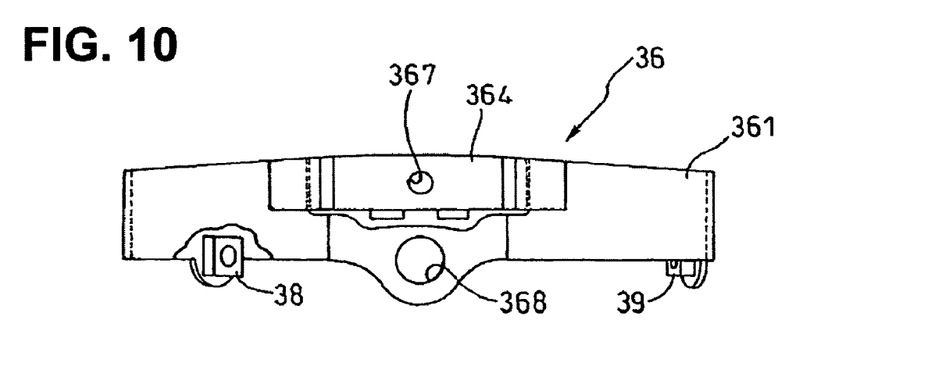
FIG. 10 is a top view of the ring member.
Figure 11:
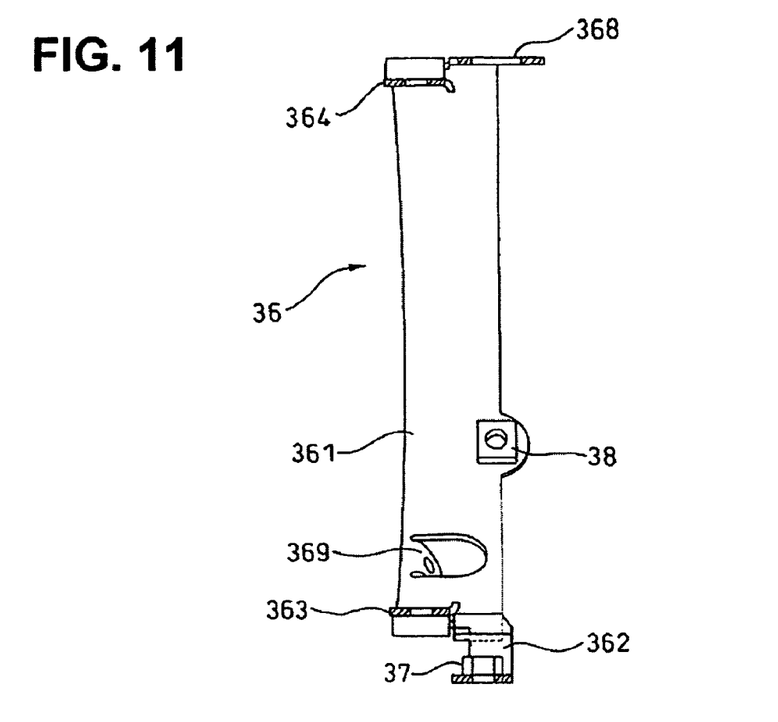
FIG. 11 is a cross-sectional view showing a side of the ring member.
Figure 12:
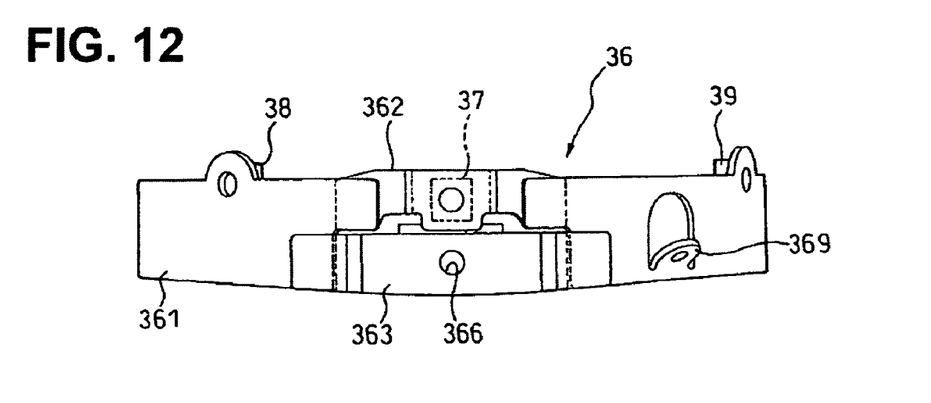
FIG. 12 is a bottom view of the ring member.

Next, a description will be given of the configuration of the ring member 36, provided to be fixed onto the inner surface of the headlight case 29. FIG. 9 is a front view (viewed from the rear of the headlight 13) of the ring member 36, FIG. 10 is a top view, FIG. 11 is a left-side view, partially in cross-section, and FIG. 12 is a bottom view. The ring member 36 includes: a ring body 361 having an open lower part; a connecting piece (curved piece) 362 and a lower support piece 363 that fits into and bridges across the open lower part of the ring body; and an upper support piece 364 connected to an upper part of the ring body 361. The connecting piece 362 is shaped curving downward so as to be in contact with the upper surface of the tab 304 of the rim 30 fitted into the headlight case 29. A nut 37 is welded onto the first piece 362. A bolt (described later) to be inserted into the through-hole 305 of the rim 30 from below is screwed down to the nut 37.

Each of the support pieces 363, 364 is curved toward the inside of the ring body 361, and has both its edge parts extending to the outer circumferential surface of the ring body 361 so that the edge parts are welded thereon. Each of the support pieces 363, 364 is provided with a hole 366, 367 respectively formed therein. Bolts (described later) are inserted into the holes 367 and 366, respectively, for adjustably pivotally supporting the light body 28 on the ring member 36 at the top and at the bottom thereof.

An alignment hole 368 is formed in the upper part of the ring body 361. The boss 294 (see FIG. 6) of the headlight case 29 is fitted into the alignment hole 368. Further, nuts 38 and 39 are welded onto the inner circumferential surface of the ring member 36. Bolts, which will be described later, are screwed into the nuts 38 and 39, respectively from outside of the headlight case 29. Furthermore, a cut-and-lifted part 369 is formed in the ring body 361 for supporting the aiming bolt.

Figure 13:
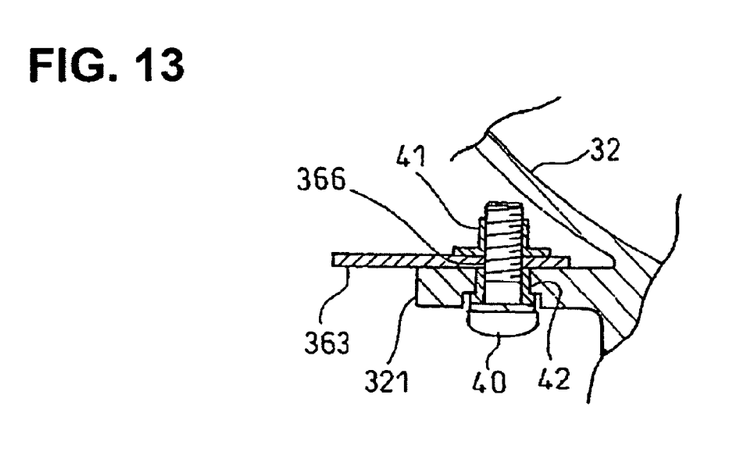
FIG. 13 is a cross-sectional view showing a state in which a light body and the ring member are connected to each other.

Next, with reference to FIGS. 1 to 3 and 13, a description will be given of the arrangement of the components described above and connection relationships therebetween. FIG. 13 is a cross-sectional view showing a state in which the lower support piece 363 of the ring member 36 and the light body 28 are connected. As shown in FIG. 13, a stay 321 protrudes from the reflector 32 of the light body 28, and the stay has a hole formed vertically therethrough. A bolt 40 is inserted from below to above through the stay 321 and the hole 366 in the lower support piece 363, and is screwed into a nut 41 above the lower support piece. A substantially cylindrical spacer 42 is provided between the head of the bolt 40 and the lower support piece 363. Thereby, even if the lower support piece 363 is fastened by the bolt 40 and the nut 41, the stay 321 is prevented from being over-tightly pinched between the lower support piece 363 and the head of the bolt 40. Accordingly, the stay 321 is pivotally movable around the bolt 40 with respect to the lower support piece 363.

Likewise, the upper support piece 364 at the upper part is connected to the light body 28 by using a bolt 43 and a nut 44. Accordingly, the light body 28 having the reflector 32 is pivotally movable around the bolts 40 and 43 with respect to the ring member 36.

Figure 14:
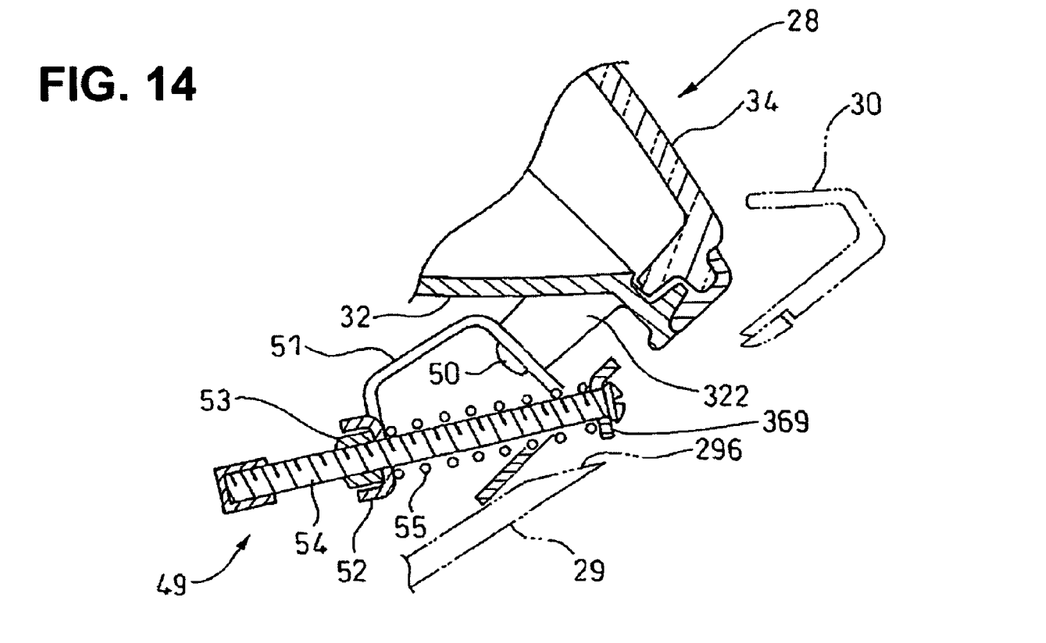
FIG. 14 is a cross-sectional view showing a main part of an aiming operation device.

The headlight 13 is provided with an aiming operation device that changes an illumination angle in the left and right directions by rotating the light body 28, with respect to the ring member 36, where the light body 28 is pivotally connected to the ring member 36 as described above. FIG. 14 is a cross-sectional view showing a main part of the aiming operation device. In FIG. 14, an aiming operation device 49 includes: a boss 322 projecting from the reflector 32 of the headlight 13; a bracket 51 fixed to the boss 322 with a set-screw 50; a position fixing nut 53 housed in a nut case 52 at a front end of the bracket 51; and an adjustment bolt 54 extending from the outside of the cut-and-lifted part 369 of the ring member 36 toward the center of the headlight 13 and screwed into the nut 53. In addition, a coil spring 55 is provided between the cut-and-lifted part 369 and the nut case 52. The coil spring 55 biases the nut case 52 toward a front end of the adjustment bolt 54.

The aiming operation device 49 allows the nut 53 to move frontward and rearward, with the adjustment bolt 54 turned from the outside of the headlight case 29 using a screwdriver or the like. Thereby, the light body 28 is adjustably rotated with respect to the ring member 36.

The ring member 36 is supported by the headlight case 29 at four positions. Firstly, the ring member 36 is supported by the headlight case 29 in a way that the boss 294 formed on the upper inner surface of the headlight case 29 is inserted into the alignment hole 368 formed in the upper part of the ring member 36 via a bushing 45. Further, bolts 46 and 47 are screwed into the nuts 38 and 39 of the ring member 36 from the outside of the headlight case 29 via the through-holes 295 and 296 of the headlight case 29, respectively. Moreover, a bolt 48 is screwed into the nut 37 of the ring member 36 via the through-hole 305 formed in the tab 304 of the rim 30.

Now, the assembly process of the headlight 13 will be described with reference to FIGS. 1 and 2. The headlight case 29 and the rim 30 are initially separated from each other. Firstly, the light body 28 and the ring member 36 are connected so as to be pivotally movable with respect to each other. The aiming operation device 49 may be attached to the light body 28 in advance, or may be attached to the light body 28 after the light body 28 is connected to the ring member 36.

The integrated assembly of the light body 28, the ring member 36, and the aiming operation device 49 is then inserted into the headlight case 29 from the front opening of the headlight case 29. The boss 294 is fitted into the rubber bushing 45 previously attached to the hole 368 formed in the upper part of the ring member 36. The cut concave part 290 is formed in the headlight case 29, with a length reaching just beyond a position right below the boss 294. Accordingly, when the boss 294 is to be fitted into the bushing 45, the lower part of the integrated assembly of the light body 28 and the ring member 36 can be held with fingers which can be inserted from the cut concave part 290. This yields excellent workability.

After the light body 28 is inserted into the headlight case 29 to attach the upper part of the ring member 36 onto the boss 294 on the upper inner surface of the headlight case 29, the bolts 46 and 47 are screwed into the nuts 38 and 39 of the ring member 36 via the through-holes 295 and 296 of the headlight case 29, respectively. At this time, the bolts 46 and 47 are not screwed tightly, but are just temporarily fixed.

Thereafter, the rim 30 is connected to the headlight case 29. Here, the engagement parts 303 formed at the upper part of the rim 30 are locked onto the ribs 292 and 293 of the headlight case 29, respectively. At the same time, the tab 304 is fitted into the cut concave part 290 of the headlight case 29. It is designed so that, when the tab 304 is fitted into the cut concave part 290, the through-hole 305 in the tab 304 may align with the nut 37 of the first piece 362 of the ring member 36. Accordingly, with the tab 304 being fitted into the cut concave part 290, the bolt 48 is inserted into the through-hole 305 and screwed into the nut 37. Finally, the bolts 46 and 47 are fastened tightly to complete the assembling.

As described above, in the present embodiment, the ring member 36 is attached around the reflector 32 having an outer shape which gets smaller from the maximum diameter part of the light body 28 toward the rear, and the ring member 36 is then fixed onto the inner surface of the headlight case 29. Accordingly, the front part, namely, the opening part of the headlight case 29 can be reduced in size, as compared to the conventional one in which the light body 28 is fixed to the headlight case 29 with a connection component interposed between the outer circumference of the retainer 33 for fixing the lens 34 and the inner diameter of the headlight case 29.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle headlight, comprising:
   a light body including a reflector having a tapered concave shape which narrows down as it extends from a front part to a rear part thereof, and a lens attached to a front face of the reflector;
   a ring member that extends around an outer circumference of a portion of the light body; and
   a headlight case in which the light body is adjustably pivotally supported via the ring member so that an aiming operation can be performed, the headlight case having an open end at a front part thereof, and formed in a tapered shape such that its inner diameter gets smaller as it extends from its front part to its rear part; and
   a rim fitted to the open end of the headlight case, and having a projecting tab extending rearwardly to a position set back from the open end of the headlight case,
   wherein the ring member pivotally supports the light body at a position rearward of the lens, and is attached to the headlight case at a position spaced rearwardly away from the open end of the headlight case; and wherein
   a concave opening is formed in a lower part of the headlight case and extending from the open end of the headlight case to the position spaced rearwardly away from the open end, so that the rearwardly projecting tab of the rim is fitted into the concave opening; and wherein
   a lower end part of the ring member is situated above the rearwardly projecting tab of the rim.

2. The motorcycle headlight according to claim 1, wherein:
   the ring member includes a ring body and a downwardly curved piece protruding from the ring body, and
   an outer circumference of the ring body is designed to be smaller than a maximum outer circumference of the light body.

3. The motorcycle headlight according to claim 2, wherein:
   a maximum outer part of the light body comprises a ring-shaped retainer that surrounds the lens proximate the open end of the headlight case.

4. The motorcycle headlight according to claim 1, wherein:
   the ring member and the headlight case are connected to each other with:
   an engagement part made up of a hole formed in an upper part of the ring member and a boss formed on an upper inner surface of the headlight case in a projecting manner;
   a first bolt and nut fastener connecting the ring member to the headlight case; and
   a second bolt and nut fastener connecting the rearwardly projecting part of the rim to the downwardly curved piece of the ring member.

5. The motorcycle headlight of claim 1, wherein the ring member comprises a ring body and a pair of upper and lower support pieces that extend across upper and lower portions of the ring body, respectively, each of the upper and lower support pieces having a respective mounting hole formed therein to pivotally receive a respective mounting member of the light body therein, such that the light body is adjustably pivotally supported on the ring member.

6. The motorcycle headlight of claim 5, wherein the reflector comprises a pair of upper and lower stays formed thereon and protruding rearwardly from a rear portion thereof, each of said stays having a respective hole formed vertically therethrough;
   and further comprising first and second cylindrical spacers which fit inside the holes of the stays, first and second fasteners having threaded shaft portions which extend through the first and second spacers, respectively, and also through the respective holes formed in the upper and lower support pieces, and first and second nuts which threadably fit onto the first and second fasteners, respectively;
   wherein the spacers have a diameter which is larger than the holes formed in the upper and lower support pieces.

7. The motorcycle headlight of claim 6, wherein the reflector also has a boss formed thereon projecting from an area proximate an outer edge thereof, and wherein the ring member has a cut-and-lifted part formed therein;
   and further comprising:
   a bracket fixed to the boss with a setscrew;
   a position fixing nut housed in a nut case at a front end of the bracket;
   an adjustment member having a threaded shaft and extending into the interior of the headlight case from outside of the cut-and-lifted part of the ring member, the threaded shaft of the adjustment member threadably engaged with the position fixing nut, and a coil spring disposed around a portion of the adjustment member's threaded shaft, the coil spring extending between the cut-and-lifted part of the ring member and the nut case.

8. A motorcycle headlight, comprising:
a light body including a reflector having a tapered concave shape which narrows down as it extends from a front part to a rear part thereof, the reflector having an opening formed in a rear portion thereof to receive a light bulb, and a lens attached to a front end portion of the reflector;
a ring member that extends around an outer circumference of a medial portion of the light body; and
a headlight case in which the light body is adjustably pivotally supported via the ring member so that an aiming operation can be performed, the headlight case having an open end at a front part thereof, and formed in a tapered shape such that its inner diameter gets smaller as it extends from its front part to its rear part; and
a rim fitted to the open end of the headlight case, and having a projecting tab extending rearwardly to a position set back from the open end of the headlight case, wherein:
the ring member pivotally supports the light body at a position rearward of the lens, and is attached to the headlight case at a position spaced rearwardly away from the open end of the headlight case,
the ring member includes a ring body and a downwardly curved piece protruding from the ring body,
an outer circumference of the ring body is designed to be smaller than a maximum outer circumference of the light body,
a concave opening is formed in a lower part of the headlight case and extending from the open end of the headlight case to the position spaced rearwardly away from the open end, so that the rearwardly projecting tab of the rim is fitted into the concave opening, and
a lower end part of the ring member is situated above the rearwardly projecting tab of the rim.

9. The motorcycle headlight according to claim 8, wherein:
a maximum outer part of the light body comprises a ring-shaped retainer that surrounds the lens proximate the open end of the headlight case.

10. The motorcycle headlight according to claim 8, wherein
the ring member and the headlight case are connected to each other with:
an engagement part made up of a hole formed in an upper part of the ring member and a boss formed on an upper inner surface of the headlight case in a projecting manner;
a first bolt and nut fastener connecting the ring member to the headlight case; and
a second bolt and nut fastener connecting the rearwardly projecting part of the rim to the downwardly curved piece of the ring member.

11. The motorcycle headlight of claim 8, wherein the ring member comprises a ring body and a pair of upper and lower support pieces that extend across upper and lower portions of the ring body, respectively, each of the upper and lower support pieces having a respective mounting hole formed therein to pivotally receive a respective mounting member of the light body therein, such that the light body is adjustably pivotally supported on the ring member.

12. The motorcycle headlight of claim 11, wherein the reflector comprises a pair of upper and lower stays formed thereon and protruding rearwardly from a rear portion thereof, each of said stays having a respective hole formed vertically therethrough;
and further comprising first and second cylindrical spacers which fit inside the holes of the stays, first and second fasteners having threaded shaft portions which extend through the first and second spacers, respectively, and also through the respective holes formed in the upper and lower support pieces, and first and second nuts which threadably fit onto the first and second fasteners, respectively;
wherein the spacers have a diameter which is larger than the holes formed in the upper and lower support pieces.

13. The motorcycle headlight of claim 12, wherein the reflector also has a boss formed thereon projecting from an area proximate an outer edge thereof, and wherein the ring member has a cut-and-lifted part formed therein;
and further comprising:
a bracket fixed to the boss with a setscrew;
a position fixing nut housed in a nut case at a front end of the bracket;
an adjustment member having a threaded shaft and extending into the interior of the headlight case from outside of the cut-and-lifted part of the ring member, the threaded shaft of the adjustment member threadably engaged with the position fixing nut, and
a coil spring disposed around a portion of the adjustment member's threaded shaft, the coil spring extending between the cut-and-lifted part of the ring member and the nut case.

14. A motorcycle headlight, comprising:
a light body including a reflector having a tapered concave shape which narrows down as it extends from a front part to a rear part thereof, and a lens attached to a front face of the reflector;
a ring member that extends around an outer circumference of a portion of the light body; and
a headlight case in which the light body is adjustably pivotally supported via the ring member so that an aiming operation can be performed, the headlight case having an open end at a front part thereof, and formed in a tapered shape such that its inner diameter gets smaller as it extends from its front part to its rear part; and
wherein the ring member pivotally supports the light body at a position rearward of the lens, and is attached to the headlight case at a position spaced rearwardly away from the open end of the headlight case, wherein the ring member comprises a ring body and a pair of upper and lower support pieces that extend across upper and lower portions of the ring body, respectively, each of the upper and lower support pieces having a respective mounting hole formed therein to pivotally receive a respective mounting member of the light body therein, such that the light body is adjustably pivotally supported on the ring member, and wherein the reflector comprises a pair of upper and lower stays formed thereon and protruding rearwardly from a rear portion thereof, each of said stays having a respective hole formed vertically therethrough;
and further comprising first and second cylindrical spacers which fit inside the holes of the stays, first and second fasteners having threaded shaft portions which extend through the first and second spacers, respectively, and also through the respective holes formed in the upper and lower support pieces, and first and second nuts which threadably fit onto the first and second fasteners, respectively;
wherein the spacers have a diameter which is larger than the holes formed in the upper and lower support pieces.

* * * * *